US011618831B2

(12) United States Patent
Weaver et al.

(10) Patent No.: US 11,618,831 B2
(45) Date of Patent: Apr. 4, 2023

(54) WATERBORNE COATINGS

(71) Applicant: APPLIED GRAPHENE MATERIALS UK LIMITED, Redcar (GB)

(72) Inventors: William Weaver, Redcar (GB); Lynn Chikosha, Redcar (GB); Adam Austin Bell, Redcar (GB); Matthew David Sharp, Redcar (GB)

(73) Assignee: APPLIED GRAPHENE MATERIALS UK LIMITED

( * ) Notice: Subject to any disclaimer, the term of this patent is extended or adjusted under 35 U.S.C. 154(b) by 0 days.

(21) Appl. No.: 17/625,518

(22) PCT Filed: Jul. 8, 2020

(86) PCT No.: PCT/GB2020/051648
§ 371 (c)(1),
(2) Date: Jan. 7, 2022

(87) PCT Pub. No.: WO2021/005370
PCT Pub. Date: Jan. 14, 2021

(65) Prior Publication Data
US 2022/0251404 A1  Aug. 11, 2022

(30) Foreign Application Priority Data
Jul. 9, 2019 (GB) ..................................... 1909802

(51) Int. Cl.
*C09D 7/20* (2018.01)
*C09D 7/80* (2018.01)
*C09D 7/40* (2018.01)
*C09D 7/62* (2018.01)
*C09D 167/08* (2006.01)

(52) U.S. Cl.
CPC ................ *C09D 7/70* (2018.01); *C09D 7/20* (2018.01); *C09D 7/62* (2018.01); *C09D 7/80* (2018.01); *C09D 167/08* (2013.01)

(58) Field of Classification Search
CPC .............. C09D 7/70; C09D 7/20; C09D 7/80
See application file for complete search history.

(56) References Cited

U.S. PATENT DOCUMENTS

| 2010/0147188 | A1* | 6/2010 | Mamak | ............ C09C 1/46 977/773 |
|---|---|---|---|---|
| 2017/0292054 | A1 | 10/2017 | Lai et al. | |
| 2020/0331761 | A1* | 10/2020 | Arao | ............ C01B 21/0648 |

FOREIGN PATENT DOCUMENTS

| CN | 104910759 A | 9/2015 |
|---|---|---|
| CN | 105060281 A | 11/2015 |
| CN | 106916506 A | 7/2017 |
| CN | 107057505 A | 8/2017 |
| CN | 107641424 A | 1/2018 |
| CN | 109468017 | 3/2019 |
| CN | 109627864 A | 4/2019 |
| EP | 1367095 A1 | 12/2003 |
| EP | 3080818 B1 | 9/2017 |
| KR | 20190079804 A | 7/2019 |
| WO | WO2017117683 A1 | 7/2017 |

OTHER PUBLICATIONS

English Korean Office Action dated Mar. 22, 2022 for Korean Application No. 10-2022-7004355, 3 pages.
The GB Office Action dated Feb. 26, 2020 for GB Application No. 1909802.9, 8 pages.
PCT Search Report and Written Opinion dated Oct. 14, 2020 for PCT Application No. PCT/GB20/051648, 13 pages.
Zhu, et al., "Electrochemical and anti-corrosion behaviors of water dispersible graphene/acrylic modified alkyd resin latex composites coated carbon steel", Journal of Applied Polymer Science, vol. 134, No. 11, Mar. 15, 2017, pp. 1, 2, 4, 8, 9, 11, 15, and 16.
Chinese Office Action dated Jun. 22, 2022 for Chinese Patent Application 202080059902.6 a foreign equivilent of U.S. Appl. No. 17/625,518 "Waterborne Coatings" Bell, A. 10 pages.

* cited by examiner

*Primary Examiner* — Vickey Nerangis
(74) *Attorney, Agent, or Firm* — Lee & Hayes, P.C.

(57) ABSTRACT

A waterborne protective coating system is disclosed that comprises at least one binder, water, and a dispersion of 2D material/graphitic nanoplatelets.

20 Claims, 5 Drawing Sheets

WATERBORNE COATINGS

This application is a US national stage entry of international Patent Application No. PCT/GB2020/051648, filed Jul. 8, 2020, which claims priority to GB1909802.9, filed Jul. 9, 2019, the entire contents of each of which are incorporated by reference herein.

TECHNOLOGICAL FIELD

This invention relates to waterborne coating systems and in particular to waterborne coating systems which include 2D material/graphitic nanoplatelets.

BACKGROUND 2D materials as referenced herein are comprised of one or more of the known 2D materials and/or graphite flakes with at least one nanoscale dimension, or a mixture thereof. They are collectively referred to herein as "2D material/graphitic nanoplatelets" or "2D material/graphitic nanoplates".

2D materials (sometimes referred to as single layer materials) are crystalline materials consisting of a single layer of atoms or up to several layers. Layered 2D materials consist of 2D layers weakly stacked or bound to form three dimensional structures. Nanoplates of 2D materials have thicknesses within the nanoscale or smaller and their other two dimensions are generally at scales larger than the nanoscale.

Known 2D nanomaterials, include but are not limited to, graphene (C), graphene oxide, reduced graphene oxide, hexagonal boron nitride (hBN), molybdenum disulphide ($MoS_2$), tungsten diselenide ($WSe_2$), silicene (Si), germanene (Ge), Graphyne (C), borophene (B), phosphorene (P), or 2D vertical or in-plane heterostructures of two of the aforesaid materials.

Graphite flakes with at least one nanoscale dimension are comprised of between 10 and 40 layers of carbon atoms and have lateral dimensions ranging from around 100 nm to 100 µm.

Waterborne coating systems have been central to coating technology development since the introduction of new regulations brought in to address the impact of volatile organic compounds (VOCs) on air quality, the environment and human health. Waterborne coating systems have been developed utilizing a range of chemistries seeking to achieve performance levels comparable to those of traditional coating systems which comprise one or more VOCs as the solvent for the coating system (hereafter referred to as "organic solvent-based coating systems").

Waterborne coating systems provide advantages over organic solvent-based coating systems because they are better for worker health and safety, and have less impact on the environment. Waterborne coating systems are easy to clean, can be thinned with water, and, if they comprise any organic solvents at all, use solvents that are lower in odour, toxicity and flammability than are used in organic solvent-based coating systems. Waterborne coating systems such as lower-VOC acrylic coatings also dry faster than organic solvent-based coatings, which allows for faster recoating times.

A particular form of waterborne coating systems which are of increasing importance given the regulations brought in to address the impact of VOCs on air quality are waterborne protective coating systems.

Protective coating systems, whether waterborne or organic solvent-based, have two key functions which are: the provision of protection against the prevailing elements/the environment, and their aesthetic appearance. Protection against the prevailing elements/the environment is, at least in part, protection against corrosion or degradation of the substrate to which the coating is applied. The mechanism of corrosion or degradation which coating is preventing will depend on the substrate. The most important types of substrate are metal, concrete, and wood/wood composites.

The problem of corrosion of metal is well documented with metallic corrosion being estimated to cost about 3% of global GDP which constitutes a significant aspect of the global economy. There is substantial interest in the development of new and improved anticorrosive coating systems. Anticorrosive coating systems for metal are generally classified in accordance with the mechanisms by which they operate: barrier protection, inhibition (passivation of the substrate), and sacrificial protection (galvanic effect). The mechanism of operation of each type of metal anticorrosive coating system is well known. For coating systems providing barrier protection, the mechanism is that the coating or film formed once the coating system has been applied and dried prevents or inhibits the passage of water across the coating to the surface of the substrate.

Concrete is a construction material which is widely used in the construction of infrastructure (for example in bridges, buildings, and highways) and is subjected to steady degradation as a result of exposure to the elements/the environment with the result that there is a significant and ongoing need for maintenance of the concrete.

Concrete structures globally undergo different forms of damage as a result of exposure to wetting and drying, freezing and thawing, and extreme temperature changes. These exposures may cause the concrete to experience damage such as surface scaling, spalling, and corrosion-induced cracking. The damage to concrete is generally greater if water has soaked into the surface of the concrete than if no water has soaked into the surface of the concrete. The damage to concrete is also generally greater if the environment in which the concrete is situated includes chloride and/or sulphate ions than if such ions are absent. The chloride and/or sulphate ions commonly originate from anti-icing or de-icing salts, seawater and or the soil.

To prevent this damage or deterioration, it is often specified that pigmented coatings should be applied to concrete structures to seek to prevent the ingress of water and substances carried in the water into the concrete structure. Such coatings may include both smooth and textured finishes, and range in technology from solvent-borne coatings (including coatings based on epoxies, acrylics and vinyltoluene resins, Michael addition resins) to waterborne coatings (including acrylics, epoxies, epoxy esters, alkyds, Michael addition resins and hybrids of these).

The application of a protective coating system to the surface layer of concrete can protect the surface layer of the concrete by retarding the ingress of water and water-laden harmful agents such as chloride and/or sulphate ions and/or de-icing chemicals into the concrete.

Wood a traditional building material is once again increasingly being seen as a material of interest for construction and the first wood-based skyscrapers have already been constructed. Of wider impact is the extensive use of wood in home construction, especially in north America and Asia. Unless wood is protected from exposure to the elements/the environment it can, however, easily take up water and suffer from rot as a consequence. If this occurs, significant remedial action is required to maintain the structure.

A challenge associated with waterborne coating systems, and in particular waterborne protective coating systems, is that application conditions can affect the appearance and performance of the final coating once it has been applied. For example, low temperatures and or extremes of humidity (high or low) must be avoided for optimal application appearance and film formation.

For waterborne protective coating systems that have barrier properties, the ability of waterborne coatings to provide the desired barrier performance is at least partially dependent on the qualities of the coating or film created once the coating system has been applied to the substrate and dried.

A first factor that affects the quality of the film is the nature of the binder in the coating system when it is ready for application to a substrate: various chemistries might be used and may include alkyd emulsions which are polyesters modified with unsaturated drying oils. On application these may crosslink through a catalysed oxidative reaction. Acrylic dispersions may be used and are frequently the copolymers of esters of acrylic and methacrylic acid. These may be thermoplastic or crosslinking systems. Two pack crosslinking systems (systems in which a hardener is mixed with the other components of the coating system immediately prior to application of the coating) are frequently used where a high level of performance is required. Typical two pack crosslink systems may combine isocyanate and hydroxyl functional acrylics. Single pack acrylic crosslinking systems (systems in which the coating does not require the addition of an external hardener) have also been developed, an example being systems that exploit the keto-hydrazide crosslinking reaction. Waterborne epoxy coatings (both Type 1 and Type 2) are a well-known waterborne chemistry for use in primer and direct to metal applications where higher performance is required. Hybridisation of these chemistries is also used in order to deliver optimized performance in individual applications.

A second factor that affects the quality of the film is the effectiveness of the film formation when the coating system dries. The process of film formation where the binder comprises a polymer which was dispersed in water as a coating system is described by a mechanism which includes three consecutive stages:
  (i) the concentration of the particles of binder (for example a polymer) dispersed through the coating system by evaporation,
  (ii) the deformation of the particles of the binder (eg polymer) and the irreversible contact between the particles, and
  (iii) the interdiffusion of the binder (eg polymer chains) across the particle boundaries leading to the formation of a continuous and mechanically stable film.

When the coating system is applied to a substrate the dispersed particles of polymer are surrounded by a layer of surfactants which are critical to their stability through the manufacturing process and their final form. In FIG. 1 the different stages towards film formation are illustrated. In greater detail:

Phase (i) is characterised by a constant loss of water with time. The concentration of the particles continually increases and, dependent on the nature and strength of particle stabilisation and the ionic strength of the serum, the dispersed particles come into close contact and pack in a more or less ordered way. The closest packing of monodisperse spheres would have an effective particle volume fraction of 0.74. The effective particle volume depends on the thickness of the enveloping hydrophilic surfactant layer on each particle.

Phase (ii) starts when the undeformed particles of polymer first come into contact. At this point, significant particle deformation can only take place if drying is taking place at a temperature well above the polymer's minimum film forming temperature (MFT) and close to or above its glass transition temperature (Tg). Only then can the particles behave like a viscous fluid which is synonymous to a slow water evaporation compared to the stress relaxation time of the polymer. For a space filling structure to form, spherical particles would have to deform into rhombic dodecahedrons.

If drying occurs at close to the minimum film forming temperature, it is possible that particle deformation will only partially occur and incomplete film formation will result. At this stage, the particle boundaries will still be present and there will often be a layer of surfactants still surrounding the particles. Although such a final film is transparent and optically clear, it may be a porous structure of unsatisfactory quality.

According to many authors there exists a phase (ii)(b), where a rupture of the surfactant layer, separating the deformed polymer particles, is prerequisite to further polymer interdiffusion and full development of mechanical strength.

In phase (iii), the desired film properties are achieved long after the water has left the film. Here, the polymer chain mobility is understood to depend on the difference between the temperature at which the film dries and the polymer's glass transition temperature (Tg). The time needed for sufficient polymer interdiffusion is lower for soft lattices or films than for hard lattices or films.

The contribution of other components of the formulation for the waterborne protective coating system can also affect the quality of the film. Some components contribute to the hydrophilicity of the coating, these are generally wetting agents or surfactants.

The use of wetting agents or surfactants is essential for the control of colloidal stability during synthesis, storage, application and film formation of waterborne coating systems. In waterborne coating systems wetting agents or surfactants are used for several reasons, they help disperse pigments, and may assist in reduction of foaming of the coating system or settling of other components out of the dispersion that is in the coating system. Typical concentrations of wetting agents or surfactants are in the range 0.5 to 5 wt % of the resin matrix used in the coating formulation, with up to 25% of those surfactants being in the continuous (water) phase.

During film formation, phase separation of the wetting agents or surfactants occurs and the wetting agents or surfactants may be mobilized with the potential to accumulate at interfaces between particles depending on their chemistry. Accumulation of the wetting agents or surfactants at the film/air boundary might result in the wetting agents or surfactants being removed during ageing of the film, this will create micropores in the film. The existence of micropores in the film will support water uptake which is undesirable.

High levels of wetting agents or surfactants in a film that results from a waterborne coating system may thus result in a film that is sensitive to water and reduce the barrier properties of the film. Other properties of the film, such as scrub resistance, may also be reduced by the levels of wetting agent or surfactant.

BRIEF SUMMARY

According to a first aspect of the present invention there is provided a waterborne protective coating system that comprises at least one binder, water, and a dispersion of 2D material/graphitic nanoplatelets.

In some embodiments of the first aspect of the present invention the 2D material/graphitic nanoplatelets are comprised of one or more of graphene or graphitic nanoplatelets, in which the graphene nanoplatelets are comprised of one or more of graphene nanoplates, reduced graphene oxide nanoplates, bilayer graphene nanoplates, bilayer reduced graphene oxide nanoplates, trilayer graphene nanoplates, trilayer reduced graphene oxide nanoplates, few-layer graphene nanoplates, few-layer graphene oxide nanoplates, few-layer reduced graphene oxide nanoplates, and graphene nanoplates of 6 to 10 layers of carbon atoms, and the graphitic nanoplatelets are comprised of graphite nanoplates with at least 10 layers of carbon atoms.

In some embodiments the present invention one or both of the graphene nanoplatelets and the graphitic nanoplatelets have lateral dimensions ranging from around 100 nm to 100 μm.

In some embodiments of the first aspect of the present invention the 2D material/graphitic nanoplatelets are comprised of one or more of graphitic nanoplatelets, in which the graphitic nanoplatelets are graphite nanoplates with 10 to 20 layers of carbon atoms, graphite nanoplates with 10 to 14 layers of carbon atoms, graphite nanoplates with 10 to 35 layers of carbon atoms graphite nanoplates with 10 to 40 layers of carbon atoms graphite nanoplates with 25 to 30 layers of carbon atoms, graphite nanoplates with 25 to 35 layers of carbon atoms, graphite nanoplates with 20 to 35 layers of carbon atoms, or graphite nanoplates with 20 to 40 layers of carbon atoms.

In some embodiments of the first aspect of the present invention the 2D material/graphitic nanoplatelets are comprised of one or more of 2D material nanoplatelets, in which the 2D material nanoplatelets are comprised of one or more of hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D in-plane or vertical heterostructure of two or more of the aforesaid materials.

Few-layer graphene/reduced graphene oxide nanoplates have between 4 and 10 layers of carbon atoms, where a monolayer has a thickness of 0.035 nm and a typical interlayer distance of 0.14 nm.

In some embodiments of the first aspect of the present invention the 2D material/graphitic nanoplatelets are comprised of graphene/graphitic nanoplatelets and at least one 1D material. In some embodiments the 1D material comprises carbon nanotubes.

In some embodiments of the present invention the dispersion of 2D material/graphitic nanoplatelets is one of the commercially available products Genable (trade mark) 1050 or Genable (trade mark) 1250 or a mixture thereof.

Genable 1050 is a dispersion of 10.0 wt % A-GNP10 graphitic nanoplatelets stabilised in water (A-GNP10 is commercially available from Applied Graphene Materials UK Plc, UK and comprises reduced graphitic oxide nanoplatelets of between 25 and 35 layers of atoms thick). Genable 1250 is a dispersion of 0.5 wt % A-GNP35 graphene nanoplatelets stabilised in water (A-GNP35 is commercially available from Applied Graphene Materials UK Plc, UK and comprises graphene nanoplatelets of between 5 and 15 layers of atoms thick). Both Genable 1050 and Genable 1250 are commercially available from Applied Graphene Materials Plc, United Kingdom.

In some embodiments of the first aspect of the present invention the waterborne protective coating system further comprises one or more additives in which the additives is a dispersing additive for grinding inorganic and organic pigments in water, defoamer, pigment, rheology modifier, resin or binder, drier, levelling agent, substrate wetting agent, flow additive, skinning preventor, flash rust inhibitor, or a mixture of two or more of the aforesaid additives.

The resin or binder may be a one part resin or binder, or may be a two part resin or binder, or may comprise more than two parts.

In some embodiments the resin or binder is an acrylic resin.

In some embodiments the resin or binder is an epoxy resin. The epoxy resin may be a one part epoxy resin or a two part epoxy resin. The epoxy resin may be one of a UV curable resin, an oxidative curable resin that air dries to form a thermoset film, or a two part epoxy resin that may be cured at ambient or elevated temperature to form a thermoset film.

In some embodiments of the first aspect of the present invention the at least one binder comprises one of an acrylic resin, an alkyd resin, an acrylic-alkyd hybrid resin, an epoxy resin, a polyester resin, a vinyl ester resin, a polyurethane resin, an aminoplast resin, a urethane resin, a polyamide resin, or a mixture of two or more of the aforesaid resins.

In some embodiments of the first aspect of the present invention the at least one binder comprises an acrylic-alkyd hybrid resin.

One embodiment of the first aspect of the present invention is as example 1 below.

In some embodiments of the first aspect of the present invention the dispersion of 2D material/graphitic nanoplatelets has a stable shelf life of at least two, three, four, five or six months under ambient storage conditions. This will have the effect that the waterborne protective coating system will have a shelf life of at least the shelf life of the dispersion of 2D material/graphitic nanoplatelets because the dispersion of 2D material/graphitic platelets will be agitated in the formulation of the waterborne protective coating system.

In some embodiments of the first aspect of the present invention the dispersion of 2D material/graphitic nanoplatelets comprises 2D material/graphitic nanoplatelets, water, at least one wetting agent, and at least one grinding media.

In some embodiments of the first aspect of the present invention the at least one grinding media of the dispersion of 2D material/graphitic platelets is a grinding media that is water soluble or functionalised to be water soluble.

In some embodiments, the grinding media is a polymer modified with strong anchoring groups. In some embodiments the grinding media is an aqueous solution of a modified aldehyde resin having at least one amine group. In some embodiments the grinding media is a low molecular weight styrene/maleic anhydride copolymer.

In some preferred embodiments, the grinding media of the dispersion of 2D material/graphitic platelets is Laropal (trade mark) LR 9008 which is a water-soluble modified aldehyde resin commercially available from BASF, Dispersions & Resins Division, North America, ADDITOL (trade mark) XL 6515 a modified alkyd polymer, ADDITOL XW 6528 a polyester modified acrylic polymer, ADDITOL XW 6535 a high polymeric, auto emulsifying pigment grinding medium, ADDITOL XW 6565 a high polymeric, auto-emulsifying pigment grinding medium, ADDITOL XW 6591 a polyester modified acrylic polymer. The ADDITOL products are commercially available from the Allnex group of companies.

In some embodiments of the first aspect of the present invention the wetting agent or agents of the dispersion of 2D material/graphitic nanoplatelets may be one of a polymeric wetting agent, an ionic wetting agent, a polymeric non-ionic dispersing and wetting agent, a cationic wetting agent, an amphoteric wetting agent, a Gemini wetting agent, a highly molecular resin-like wetting and dispersing agent or a mixture of two or more of these wetting agents. Gemini wetting agents have two polar centres or head groups in the polyether segment which are connected by a spacer segment.

Preferred wetting agents in the dispersion of 2D material/graphitic nanoplatelets include but are not limited to ADDITOL (trade mark) VXW 6208/60, a modified acrylic copolymer which is a polymeric non-ionic dispersing and wetting additive commercially available from Allnex Belgium SA/NV; and DISPERBYK-2150 (trade mark) a block copolymer with basic, pigment-affinic groups commercially available from BYK-Chemie GmbH, and Surfynol (trade mark) 104 a Gemini wetting agent and molecular defoamer commercially available from Evonik Nutrition & Care GmbH.

The waterborne protective coating systems according to the first aspect of the present invention are advantageous because the application of a layer of coating system to a substrate will, depending on concentration of the 2D material/graphitic nanoplatelets in the coating and applied dry film thickness, result in multiple layers of 2D material/graphitic nanoplatelets in the film. Each layer of 2D material/graphitic nanoplatelets is potentially several atomic layers thick. The presence of multiple layers of 2D material/graphitic nanoplatelets provides a complex and tortuous or labyrinthine path for the penetration of water and any dissolved oxygen, chloride and/or sulphate ions or similar ions the water carries. This will substantially reduce the water vapour transmission rates across the film relative to an equivalent film that does not incorporate 2D material/graphitic nanoplatelets.

The waterborne protective coating systems according to the first aspect of the present invention are also advantageous because the coating systems incorporate smaller quantities of wetting agent than has proven possible previously. This has the benefit that there is less wetting agent in the film formed from the coating system than previously and, as such, less likelihood of defects in that film, such as micropores, as a result of the removal of the wetting agent.

This is because it is known that the introduction of graphene into waterborne systems has traditionally been undertaken by stirring graphene powder or a water dispersion thereof into a binder dispersion. During this process the graphene is effectively being dispersed into a continuous phase. Such dispersions typically result in the coagulation of the binder or resin particles and the crashing of the dispersion. That is the binder particles come out of dispersion, aggregate, and form a sediment in the container in which the mixing takes place. This is caused by the high surface area of the graphene competing for the surfactant present on the binder or resin, the net reduction of the surfactant on the binder or resin causes the binder or resin's destabilisation. Where polymeric self-crosslinking surfactants are used, these are less available to the graphene and the graphene itself will become destabilised, aggregate and sediment.

The inclusion of additional surfactant in a graphene dispersion will, while providing some stabilisation in the coating system, result in significant loadings of surfactant in the final film formed from the coating system. This will result in the surfactant migrating to either the film/air interface or the film/substrate interface. At the film/air interface the surfactant will be liable to removal on exposure to the environmental impacts causing the formation of micropores in the film. At the film/substrate interface the surfactant can cause a reduction in adhesion between the film and the substrate.

It is thought that this is because water as a solvent has a high level of polarity while, in contrast, graphene/graphitic nanoplatelets with a high Carbon/Oxygen ratio have a low polarity and a high degree of hydrophobicity which makes the two repel each other. This causes the graphene/graphitic nanoplatelets to aggregate, flocculate and not disperse. In some embodiments of the present invention where the 2D material/graphitic platelets are graphene/graphitic nanoplatelets the Carbon/Oxygen ratio of the graphene/graphitic nanoplatelets is equal to or greater than 15.

According to a second aspect of the present invention there is provided a method of formulation of a waterborne protective coating system of the first aspect of the present invention comprising the steps of (a) obtaining a liquid dispersion of 2D material/graphitic nanoplatelets in an aqueous solution, and (b) mixing the liquid dispersion with at least one binder and water.

In some embodiments of the second aspect of the present invention the method of step (a) comprises the steps of (i) creating a dispersing medium;

(ii) mixing 2D material/graphitic nanoplatelets into the dispersing medium; and (iii) subjecting the 2D material/graphitic nanoplatelets to sufficient shear forces and or crushing forces to reduce the particle size of the 2D material/graphitic nanoplatelets, characterised in that the 2D material/graphitic nanoplatelets and dispersing medium mixture comprises the 2D material/graphitic nanoplatelets, at least one grinding media, water, and at least one wetting agent, and that the at least one grinding media is water soluble or functionalised to be water soluble.

In some embodiments of the second aspect of the present invention the step of subjecting the 2D material/graphitic nanoplatelets to sufficient shear forces and or crushing forces to reduce the particle size of the 2D material/graphitic nanoplatelets is performed using a grinding mill, a dissolver, a bead mill, or a three-roll mill.

In some embodiments of the second aspect of the present invention the 2D material/graphitic nanoplatelets are comprised of one or more of graphene or graphitic nanoplatelets, in which the graphene nanoplatelets are comprised of one or more of graphene nanoplates, reduced graphene oxide nanoplates, bilayer graphene nanoplates, bilayer reduced graphene oxide nanoplates, trilayer graphene nanoplates, trilayer reduced graphene oxide nanoplates, few-layer graphene nanoplates, few-layer reduced graphene oxide nanoplates, and graphene nanoplates of 6 to 10 layers of carbon atoms, and the graphitic platelets are comprised of graphite nanoplates with at least 10 layers of carbon atoms.

In some embodiments the second aspect of the present invention one or both of the graphene nanoplatelets and the graphitic nanoplatelets have lateral dimensions ranging from around 100 nm to 100 μm.

In some embodiments of the second aspect of the present invention the 2D material/graphitic nanoplatelets are comprised of one or more of graphitic platelets, in which the graphitic nanoplatelets are graphite nanoplates with 10 to 20 layers of carbon atoms, graphite nanoplates with 10 to 14 layers of carbon atoms, graphite nanoplates with 10 to 35 layers of carbon atoms graphite nanoplates with 10 to 40 layers of carbon atoms, graphite nanoplates with 25 to 30 layers of carbon atoms, graphite nanoplates with 25 to 35 layers of carbon atoms, graphite nanoplates with 20 to 35 layers of carbon atoms, or graphite nanoplates with 20 to 40 layers of carbon atoms.

In some embodiments of the second aspect of the present invention the 2D material/graphitic nanoplates are comprised of one or more of 2D material nanoplates, in which the 2D material nanoplates are comprised of one or more of hexagonal boron nitride (hBN), molybdenum disulphide ($MoS_2$), tungsten diselenide ($WSe_2$), silicene (Si), germanene (Ge), Graphyne (C), borophene (B), phosphorene (P), or a 2D in-plane or vertical heterostructure of two or more of the aforesaid materials.

Few-layer graphene/reduced graphene oxide nanoplates have between 4 and 10 layers of carbon atoms, where a monolayer has a thickness of 0.035 nm and a typical interlayer distance of 0.14 nm.

In some embodiments of the second aspect of the present invention the 2D material/graphitic nanoplates are comprised of graphene/graphitic nanoplates and at least one 1D material. In some embodiments the 1D material comprises carbon nanotubes.

In some embodiments of the second aspect of the present invention the at least one of the at least one grinding media is water soluble or functionalised to be water soluble. In some embodiments, the grinding media is a polymer modified with strong anchoring groups. In some embodiments the grinding media is an aqueous solution of a modified aldehyde resin having at least one amine group which may have been introduced into the backbone of the polymer, or by reacting an amine with functional groups on the resin to form a salt. In some embodiments the grinding media is a low molecular weight styrene/maleic anhydride copolymer.

In some preferred embodiments, the grinding media of the dispersion of 2D material/graphitic platelets is Laropal (trade mark) LR 9008 which is a water-soluble modified aldehyde resin commercially available from BASF, Dispersions & Resins Division, North America, ADDITOL (trade mark) XL 6515 a modified alkyd polymer, ADDITOL XW 6528 a polyester modified acrylic polymer, ADDITOL XW 6535 a high polymeric, auto emulsifying pigment grinding medium, ADDITOL XW 6565 a high polymeric, auto-emulsifying pigment grinding medium, ADDITOL XW 6591 a polyester modified acrylic polymer. The ADDITOL products are commercially available from the Allnex group of companies.

In some embodiments of the second aspect of the present invention the dispersing medium comprises a mixture of the at least one grinding media and water, and the step of creating a dispersing medium comprises (i) mixing the at least one grinding media with the water until it is substantially homogenous.

In some embodiments of the second aspect of the present invention the at least one grinding media is a liquid and the dispersing medium comprises between 50 wt % and 90 wt % of the at least one grinding media and between 10 wt % and 50 wt % of water, between 60 wt % and 80 wt % of the at least one grinding media and between 20 wt % and 40 wt % of water; between 65 wt % and 75 wt % of the at least one grinding media and between 25 wt % and 35 wt % of water, or around 70 wt % of the at least one grinding media and around 30 wt % of water.

In some embodiments of the second aspect of the present invention the dispersing medium further comprises the at least one wetting agent, the wetting agent is stored as a liquid, and the step of creating the dispersing medium comprises (i) mixing the at least one grinding media, water and wetting agent until the grinding media, water and wetting agent mixture is substantially homogenous.

In some embodiments of the second aspect of the present invention the dispersing medium further comprises the at least one wetting agent, the wetting agent is stored as a solid (which term includes powder), and the step of creating the dispersing medium comprises (i) mixing the at least one grinding media, water and wetting agent until the grinding media and wetting agent are dissolved and the grinding media, water and wetting agent mixture is substantially homogenous.

In some embodiments of the second aspect of the present invention the at least one wetting agent is added to the dispersing medium at substantially the same time as the 2D material/graphitic nanoplatelets.

The wetting agent or agents of the dispersion of 2D material/graphitic nanoplatelets of the present invention may be one of a polymeric wetting agent, an ionic wetting agent, a polymeric non-ionic dispersing and wetting agent, a cationic wetting agent, an amphoteric wetting agent, a Gemini wetting agent, a highly molecular resin-like wetting and dispersing agent or a mixture of two or more of these wetting agents.

Preferred wetting agents of the dispersion of 2D material/graphitic nanoplatelets include but are not limited to ADDITOL (trade mark) VXW 6208/60, a modified acrylic copolymer which is a polymeric non-ionic dispersing and wetting additive commercially available from Allnex Belgium SA/NV; and DISPERBYK-2150 (trade mark) a block copolymer with basic, pigment-affinic groups commercially available from BYK-Chemie GmbH, and Surfynol (trade mark) 104 a Gemini wetting agent and molecular defoamer commercially available from Evonik Nutrition & Care GmbH.

Dry 2D material/graphitic nanoplatelets, for example graphene/graphitic nanoplatelets, are typically made up of agglomerates or aggregates of primary particles or nanoplatelets. During the dispersion process those agglomerates or aggregates have to be broken down, as far as possible, into primary particles or nanoplatelets of a size suitable for the intended application of the 2D material/graphitic nanoplatelets. The breaking down of the agglomerates or aggregates of primary particles or nanoplatelets is believed to include the process of exfoliation.

In some embodiments of the second aspect of the present invention the dispersing means is a means suitable to apply both a crushing action and a mechanical shearing force to the 2D material/graphitic nanoplatelets whilst those materials are mixed in with the dispersing medium. Suitable apparatus to achieve this are known grinding or milling apparatus such as dissolvers, bead mills or three-roll mills.

In some embodiments of the second aspect of the present invention it is preferred that the agglomerates or aggregates are broken down to particles or nanoplatelets of a particle size which cannot be broken down further. This is beneficial because the manufacture and storage of 2D material/graphitic nanoplatelets prior to their use is often in the form of particles that are larger than desired for 2D material/graphitic nanoplatelet dispersions.

Once the 2D material/graphitic nanoplatelets agglomerates or aggregates are reduced to smaller particles or nanoplatelets, rapid stabilisation of the newly formed surfaces resultant from the reduction in size of the agglomerates or aggregates helps to prevent the particles or nanoplatelets re-agglomerating or re-aggregating.

The method of the second aspect of the present invention is particularly beneficial because it has been found that the higher the interfacial tension between a dispersing medium, for example a dispersing medium which comprises water and 2D material/graphitic platelets, the stronger are the forces tending to reduce the interfacial area. In other words, the stronger are the forces tending to re-agglomerate or re-aggregate the 2D material/graphitic nanoplatelets or to form flocculates. The interfacial tension between a wetting agent in the dispersing medium and the 2D material/graphitic nanoplatelets is lower than that between the water and the 2D material/graphitic platelets and as such the wetting agent helps stabilise the newly formed surfaces and prevent the 2D material/graphitic nanoplatelets agglomerating, aggregating and or flocculating.

The action of the wetting agent in stabilising the newly formed surfaces and preventing the 2D material/graphitic nanoplatelets agglomerating, aggregating and or flocculating is beneficial but has been found not to give sufficient benefit to allow the formation of improved stable dispersions. This is because although the wetting agent will allow the 2D nanomaterial to be suspended in an aqueous dispersing medium, it is a feature of 2D material/graphitic nanoplatelets that they have a high surface area relative to other compounds. Water having a high polarity may displace the wetting agent.

An increase in the proportion of the wetting agent in the dispersing medium may, ultimately lead to a dispersion in which all the components remain suspended. This approach to forming a dispersion has the problem, however, that coatings formed from the dispersion will have a high degree of solubility in water. This is very undesirable because it leads to the rapid failure of the coating.

According to the second aspect of the present invention the application of a crushing action and or mechanical shearing forces to a dispersion comprising a mixture of 2D material/graphitic nanoplatelets in a grinding media, water and wetting agent mixture results in an improved dispersion.

This is thought to be because, in addition to the wetting agent, the grinding media will also stabilise the newly formed surfaces of the 2D material/graphitic nanoplatelets because a proportion of the 2D material/graphitic nanoplatelets are at least partially encapsulated within a coating of grinding media. The wetting agent can then interact with the combined grinding media/2D material/graphitic platelet nanoparticle and allow the grinding resin/2D material/graphitic nanoplatelet particle to be suspended in the dispersion. Combination of grinding media with wetting agent results in less wetting agent being required to wet the 2D material/graphitic nanoplatelets enabling suspension in the dispersion so minimising the problems resulting from high levels of surfactant (water sensitivity).

A further advantage of the method of the present invention is that the milling performance of the dispersion means when acting on 2D material/graphitic nanoplatelets, is further improved by the presence of the grinding media in the mixture being milled. That improvement is exhibited by faster milling, lower heat generation in the milling process, a more uniform particle size in the dispersion, a smaller D50 particle size in the dispersion, a lower dispersion viscosity, a greater storage stability relative to known short shelf life dispersions, and an ability to re-disperse any combined grinding media/2D material/graphitic nanoplatelet particles that have settled out of the dispersion by simple agitation of the dispersion.

The development of a grinding media supported dispersion of 2D material/graphitic nanoplatelets where the grinding media support is water soluble enables the dispersion of the 2D material/graphitic nanoplatelets in the continuous phase where the 2D material/graphitic nanoplatelets are stabilised within a water-based entity and does not compete significantly with the grinding media for stabiliser. The development of stable water based dispersions incorporating 2D material/graphitic nanoplatelets enables the development of 2D material/graphitic nanoplatelet supported paint formulations and improvement of the barrier performance of water-based systems which might be applied to a number of substrates; metal for corrosion improvement, wood for prevention of water uptake and concrete for prevention of water uptake and degradation.

A further advantage of the waterborne protective coating system according to the first aspect of the present invention is that in commonly used coating binder systems for use on wood, undergo surface photodegradation. This is the result of UV radiation in sunlight breaking down the down the polymer, such a breakdown is slow and results in the erosion of the film from the surface of the wood. The wood can then be attacked by water and mildew resulting in the onset of degradation and rot, with the attendant result that significant maintenance and repair might be required.

When the waterborne protective coating systems according to the first aspect of the present invention comprises graphene nanoplates or graphitic nanoplates and the binder is an organic polymer those nanoplates absorb of UV light and as such help protect the film formed from the coating system.

BRIEF DESCRIPTION

For a better understanding of various examples that are useful for understanding the detailed description, reference will now be made by way of example only to the accompanying drawings in which.

DETAILED DESCRIPTION

Examples

Figure 1:
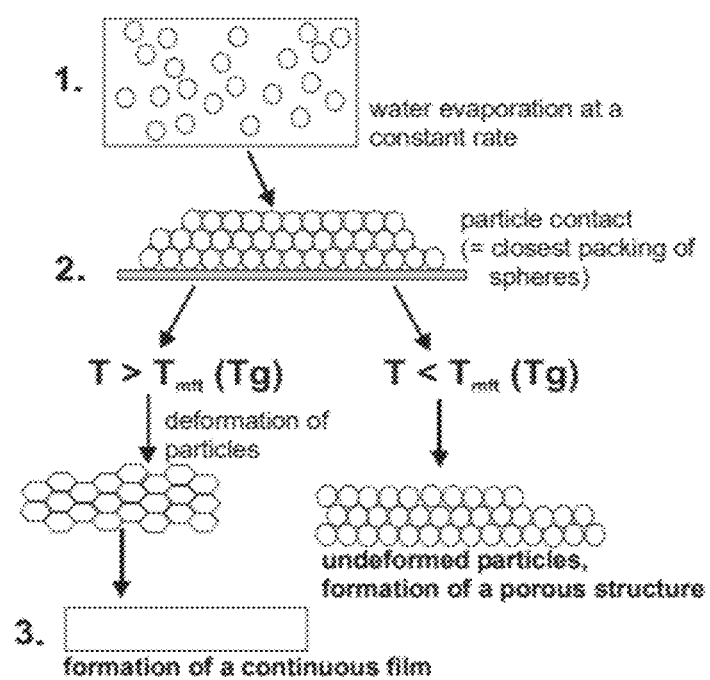
FIG. 1 shows the different stages towards film formation.

A control sample (DTM1) and four samples of formulation according to the first aspect of the present invention (DTM2 to DTM5) were manufactured according to the formulations shown in Table 1.

TABLE 1

Weight % of Genable ® 1250 in Formulation

| | | Sample number: | | | |
|---|---|---|---|---|---|
| | | 6131 | 9131 5% Genable ® 1250 | 982 10% Genable ® 1250 | 983 20% Genable ® 1250 |
| Item | Material | Control | | | |
| 1 | Dionised Water | 5.95% | 5.65% | 5.36% | 4.76% |
| 2 | Additol VXW 6208 | 1.81% | 1.72% | 1.63% | 1.45% |
| 3 | Additol VXW 6393 | 0.23% | 0.22% | 0.21% | 0.19% |
| 4 | Ti-Pure R-706 | 25.96% | 24.66% | 23.36% | 20.77% |
| 5 | Acrysol RM-2020E | 0.19% | 0.18% | 0.17% | 0.15% |
| 6 | Resydrol AY 6150w/45WA | 60.26% | 57.25% | 54.24% | 48.21% |
| 7 | Ammonia (29%) | 0.43% | 0.41% | 0.39% | 0.35% |
| 8 | Additol VXW 6206 | 0.68% | 0.64% | 0.61% | 0.54% |
| 9 | Additol VXW 6503 N | 0.31% | 0.29% | 0.27% | 0.24% |
| 10 | Additol VXW 4973 | 0.18% | 0.17% | 0.16% | 0.15% |
| 11 | Modaflow AQ-3025 | 0.50% | 0.47% | 0.45% | 0.40% |
| 12 | Additol XL 297 | 0.54% | 0.51% | 0.48% | 0.43% |
| 13 | Acrysol RM-8W | 0.97% | 0.92% | 0.88% | 0.78% |
| 14 | Acrysol RM 2020E | 0.83% | 0.79% | 0.75% | 0.67% |
| 15 | Dionised Water | 0.17% | 0.16% | 0.15% | 0.14% |
| 17 | Genable ™ 1250 | 0.00% | 4.95% | 9.90% | 19.80% |
| 16 | HaloX Flash-X 150 | 1.00% | 1.00% | 1.00% | 1.00% |
| | Total | 100.00% | 100.00% | 100.00% | 100.00% |
| | pvc | 20.08% | 25.65% | 30.48% | 38.46% |
| | VOC (g/l) | 10.43 | 9.91 | 9.38 | 8.34 |

The materials shown in Table 1 are as follows: Additol VXW 6208 is a polymer non-ionic dispersing additive for grinding inorganic and organic pigments in water, Additol VXW 6393 is a defoamer, Ti-Pure R-706 is a titanium dioxide pigment, Acrysol RM2020E is a hydrophobically modified ethylene oxide urethane (HEUR) high-shear rheology modifier, Resydrol AY 6150w/45WA is an air-drying acrylic modified alkyd resin emulsion (i.e. an acrylic-alkyd hybrid resin), Additol VXW 6206 is an emulsified, non-ylphenylethoxylate free combination drier of cobalt, lithium and zirconium, Additol VXW 6503 N is a levelling and substrate wetting agent based on a polyether modified polysiloxan for waterborne paint systems, Additol VXW 4973 is a defoamer, Modaflow AQ-3025 is an acrylic flow additive for aqueous coatings, Additol XL 297 is a skinning preventor, Acrysol RM-8W is a non-ionic urethane rheology modifier, and HaloX Flash-X 150 is for the inhibition of flash rust and in-can rusting in lined and unlined metal containers.

Additol, Resydrol and Modaflow are trade marks of Allnex Belgium SA and the products incorporating that name are available from that company. Ti-Pure is a trade mark of The Chemours Company and the product incorporating that name is available from that company. Acrysol is a trade mark of The Dow Chemical Company and the products incorporating that name are available from that company. Halox is a trade mark of ICL Specialty Products Inc. and the product incorporating that name is available from that company.

The control sample was a commercial brand water borne acrylic formulation.

Manufacture followed the following steps:

A pigment paste was made in a mechanical mixer:

Items 1 and 2 were added to the mixer and the speed adjusted to maintain a consistent vortex (the mixer is at a medium speed). Items 1 and 3 were dispersed for 5-10 minutes.

Items 3 and 4 are added and dispersed for 10 minutes at a medium—high mixer speed.

Item 5 is added and dispersed for 20-30 minutes at high mixer speed to obtain a Hegman of 7+.

The pigment paste is then let down in a mechanical mixer:

Items 6-8 are added to a mechanical mixer and the speed adjusted to maintain a consistent vortex. Shear is applied to items 6-8 by the mixer for a minimum of 10 minutes at high speed.

Items 9-12 and the pigment paste previously prepared are added to the mixer and shear is applied for a minimum of 10 minutes at low-medium speed.

Items 13-15 are added and mixed for 10 minutes.

Items 16-17 are added and mixed for 10 minutes

Test panels were made with the characteristics shown in Table 2 and scribed in the usual fashion for testing.

TABLE 2

| | |
|---|---|
| Substrate | Cold Rolled Carbon Steel |
| Dimensions | 150 mm by 100 mm |
| Preparation | Blasted steel (50 to 75 micron blast profile), Q-lab Bonderite steel and Q-Lab Abraded steel |
| Application | Drawdown bar |
| Coating Thickness | 110 micron wet, Dried film thickness (DET) = 50 to 60 microns |
| Curing | 7 days at 23° C. |

The test panels were tested to evaluate and determine if a coating system according to the present invention could deliver a meaningful extension of life relative to waterborne acrylic coatings typically used in C3 type (medium) corrosivity environments as defined in ISO 12944-2.

Accelerated exposure testing was performed. The testing regime was Salt Spray Testing ASTM B117 Neutral Salt Spray Fog Testing: Corrosion Creep Assessment to ISO4628-2-2003 and ISO4628-3-2003.

Figure 2:
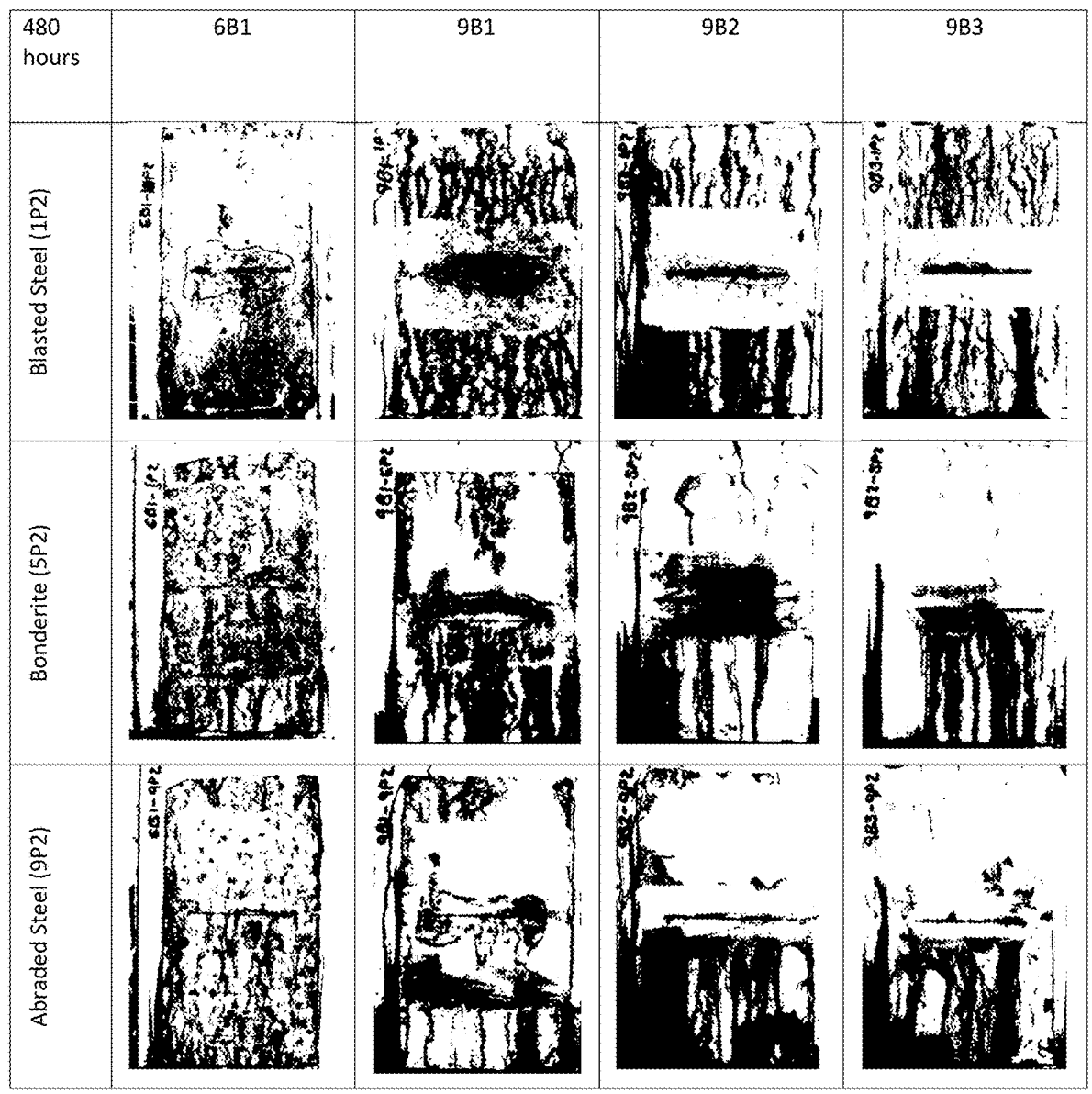
FIG. 2 shows images of test panels with coating cleaned off after Salt Spray Testing for 480 Hours ASTM B117 Neutral Salt Spray Fog Testing Results.

Images of test panels with coating cleaned off after Salt Spray Testing for 480 Hours ASTM B117 Neutral Salt Spray Fog Testing Results are shown in FIG. 2.

Figure 3:
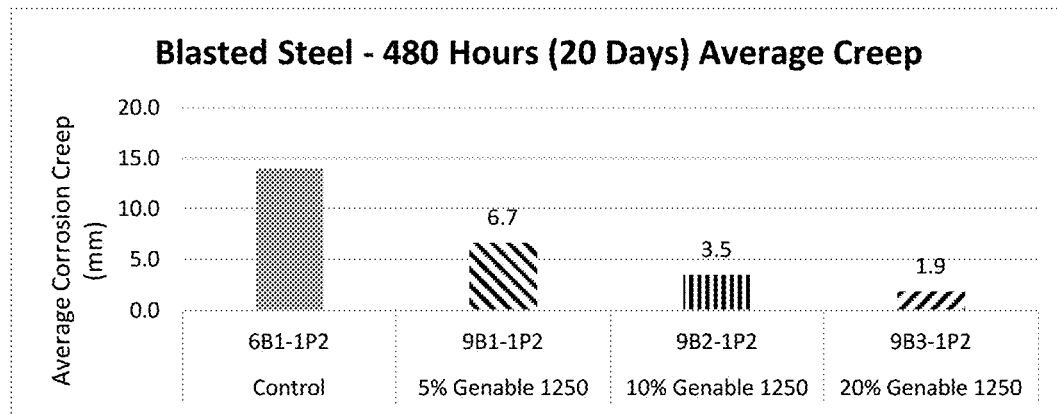
FIG. 3 shows results of the measured corrosion average creep of coated Blasted Steel (480 hours)
Figure 4:
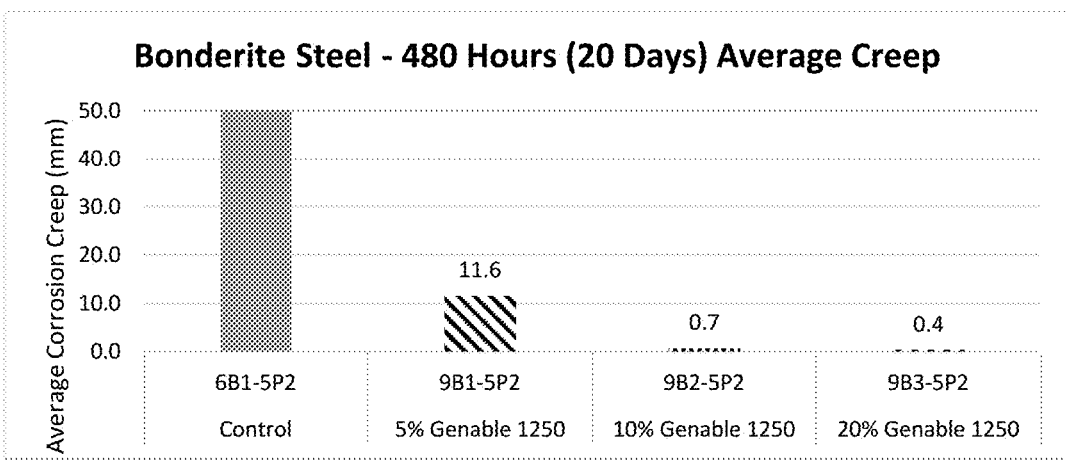
FIG. 4 shows results of the measured corrosion average creep of coated Bonderite Steel (480 hours)
Figure 5:
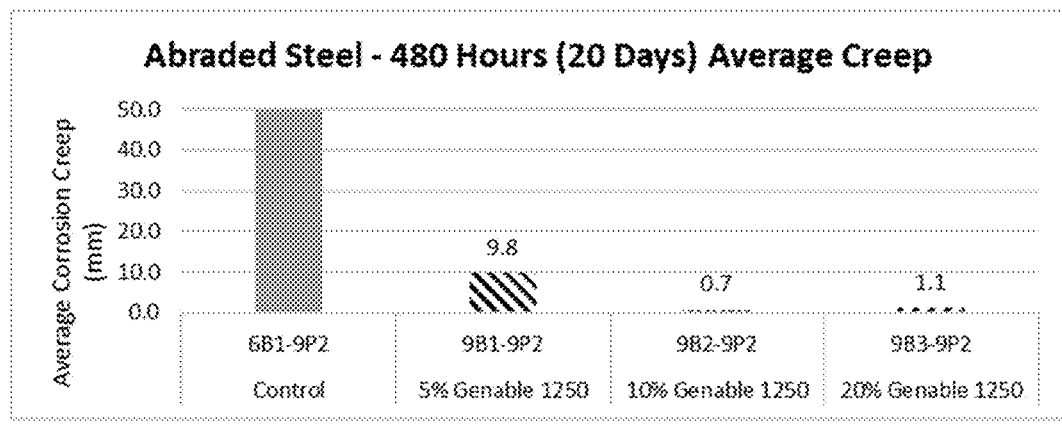
FIG. 5 shows results of the measured corrosion average creep of coated Abraded Steel (480 hours)

The results of the measured corrosion average creep are as shown in FIGS. 3 to 5.

It is noted that, except for the 480-hour assessment of the coated Blasted Steel control panel, all of the other control panels at both 480 hours and 1000 hours testing had substantial levels of corrosion emanating from the scribe and/or a complete failure in terms of corrosion. These panels have been denoted as having an average creep corrosion of 50 mm to aid pictorial representation in FIGS. 3 to 5 and 7 to 9.

Figure 6:
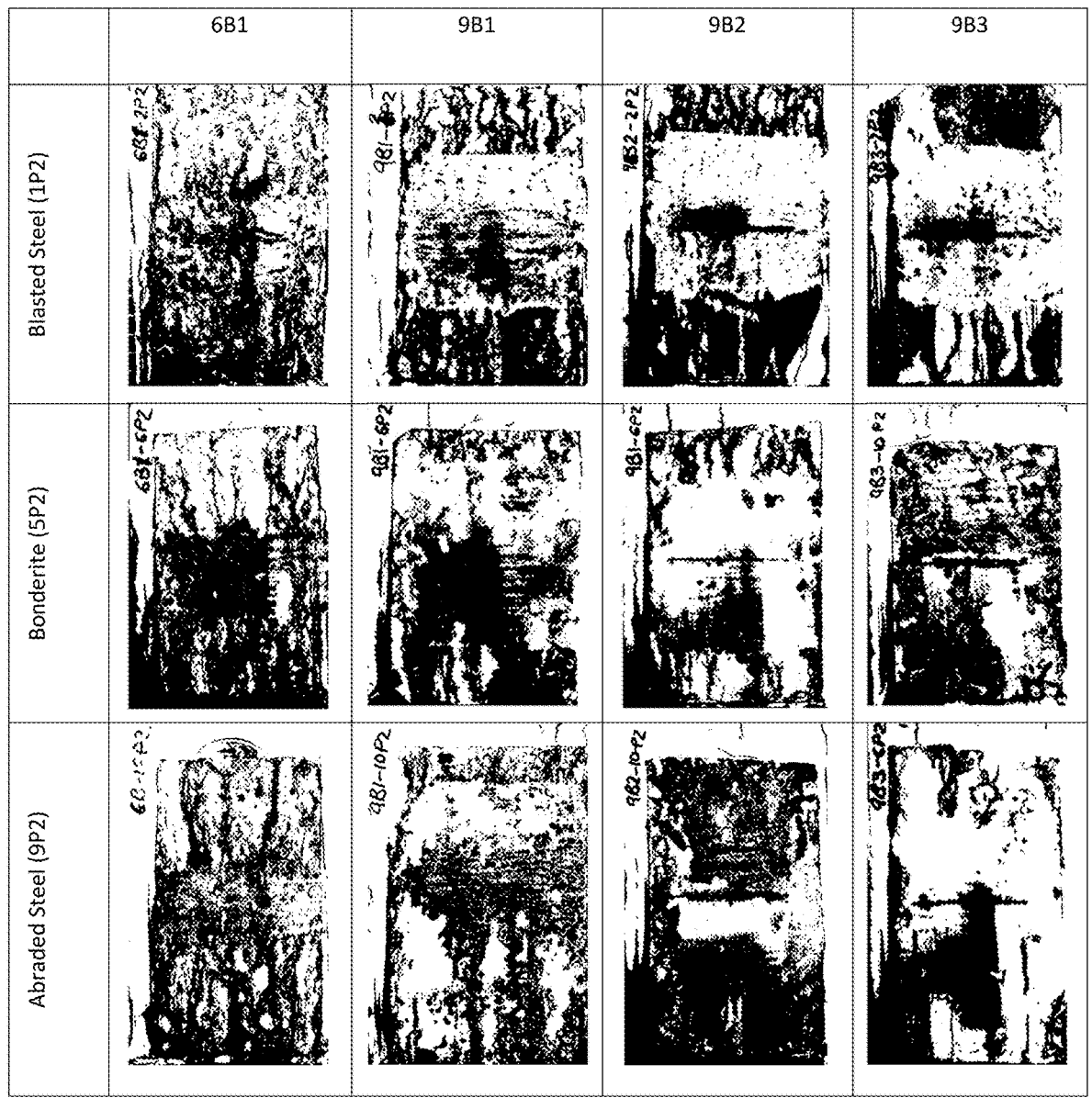
FIG. 6 shows images of test panes with coating cleaned off after Salt Spray Testing for 1000 Hours ASTM B117 Neutral Salt Spray Fog Testing Results.

Images of test panes with coating cleaned off after Salt Spray Testing for 1000 Hours ASTM B117 Neutral Salt Spray Fog Testing Results are shown in FIG. 6.

Figure 7:
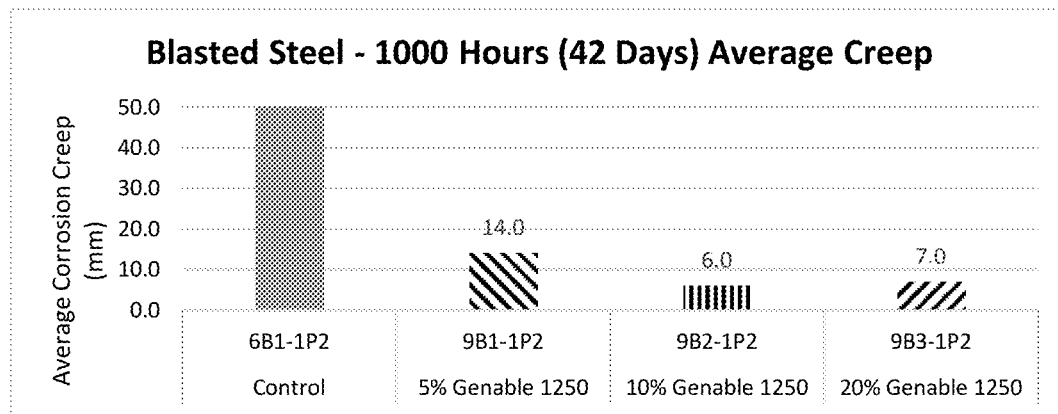
FIG. 7 shows results of the measured corrosion average creep of coated Blasted Steel (1000 hours)
Figure 8:
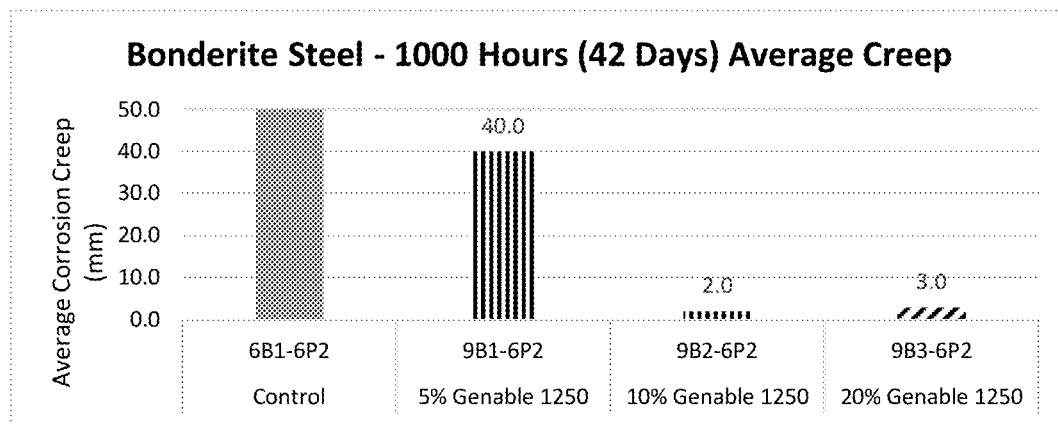
FIG. 8 shows results of the measured corrosion average creep of coated Bonderite Steel (1000 hours)
Figure 9:
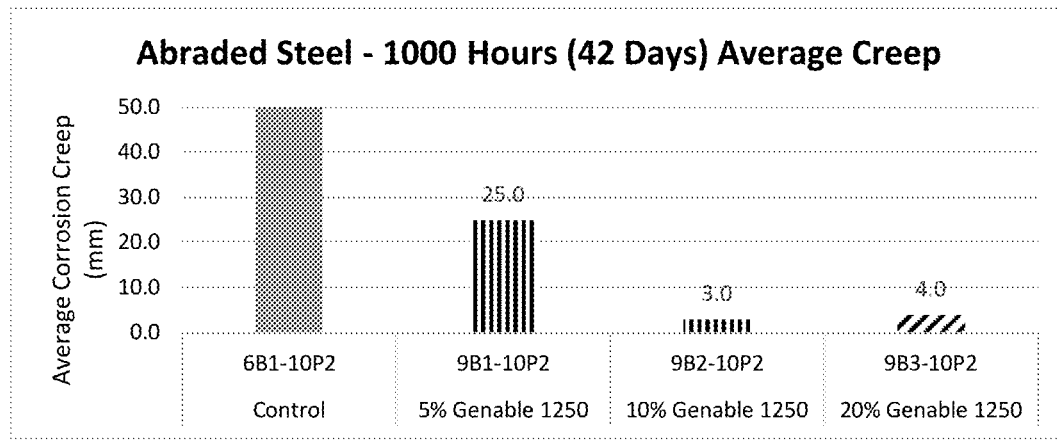
FIG. 9 shows results of the measured corrosion average creep of coated Abraded Steel (1000 hours).

The results of the measured corrosion average creep are as shown in FIGS. 7 to 9.

In the images shown of the panels in the accelerated exposure tests (ASTM B117 Neutral Salt Spray Fog Testing Results) at 480 hours and 1000 hours testing duration respectively (FIGS. 2 and 6); the graphene nanoplatelets in the acrylic formulation has reduced the corrosion observed at the scribe. The reduction in corrosion at the scribe on the test panels is the most pronounced at additions levels of Genable (trade mark) 1250 at 10% and 20% wt in the tested formulations. This performance improvement will translate into a meaningful extension of coating life for real life applications.

The invention claimed is:

1. A waterborne protective coating system that comprises at least one binder, water, and a dispersion of 2D material/graphitic nanoplatelets,
   wherein the 2D material/graphitic nanoplatelets are comprised of one or more of graphene nanoplatelets, graphitic nanoplatelets, and 2D material nanoplatelets and in which the graphene nanoplatelets are comprised of one or more of graphene nanoplates, reduced graphene oxide nanoplates, bilayer graphene nanoplates, bilayer reduced graphene oxide nanoplates, trilayer graphene nanoplates, trilayer reduced graphene oxide nanoplates, few-layer graphene nanoplates, few-layer graphene oxide nanoplates, few-layer reduced graphene oxide nanoplates, and graphene nanoplates of 6 to 10 layers of carbon atoms, and the graphitic nanoplatelets are comprised of one or more of graphite flakes with at least 10 layers of carbon atoms, graphite nanoplates with 10 to 20 layers of carbon atoms, graphite nanoplates with 10 to 14 layers of carbon atoms, graphite nanoplates with 10 to 35 layers of carbon atoms, graphite nanoplates with 10 to 40 layers of carbon atoms, graphite nanoplates with 25 to 30 layers of carbon atoms, graphite nanoplates with 25 to 35 layers of carbon atoms, graphite nanoplates with 20 to 35 layers of carbon atoms, or graphite nanoplates with 20 to 40 layers of carbon atoms, and the 2D material nanoplatelets are comprised of one or more of hexagonal boron nitride (hBN), molybdenum disulphide ($MoS_2$), tungsten diselenide ($WSe_2$), silicene (Si), germanene (Ge), graphyne (C), borophene (B), phosphorene (P), or a 2D in-plane or vertical heterostructure of two or more of the aforesaid materials,
   wherein the dispersion of 2D material/graphitic nanoplatelets comprises the 2D material/graphitic nanoplatelets, water, at least one wetting agent, and at least one grinding media, wherein the at least one grinding media is water soluble or functionalised to be water soluble, and wherein the dispersion comprises between 50 wt % and 90 wt % of the at least one grinding media.

2. A waterborne protective coating system according to claim 1 in which the 2D material/graphitic nanoplatelets further comprises at least one 1D material.

3. A waterborne protective coating system according to claim 2 in which the 1D material comprises carbon nanotubes.

4. A waterborne protective coating system according to claim 1 in which the coating system further comprises an additive, the additive comprising one of or a mixture of two or more of a dispersing additive for grinding inorganic and organic pigments in water, a defoamer, a pigment, a rheology modifier, a resin or binder, a levelling agent, a substrate wetting agent, a flow additive, a skinning preventor, or a flash rust inhibitor.

5. A waterborne protective coating system according to claim 4 in which the resin or binder of the additive is an acrylic resin or an epoxy resin.

6. A waterborne protective coating system according to claim 1 in which the at least one wetting agent comprises one of a polymeric wetting agent, an ionic wetting agent, a polymeric non-ionic dispersing and wetting agent, a cationic wetting agent, an amphoteric wetting agent, a Gemini wetting agent, a highly molecular wetting and dispersing agent or a mixture of two or more of these wetting agents.

7. A waterborne protective coating system according to claim 1 in which the at least one binder comprises one of an acrylic resin, an alkyd resin, an acrylic-alkyd hybrid resin, an epoxy resin, a polyester resin, a vinyl ester resin, a polyurethane resin, an aminoplast resin, a urethane resin, a polyamide resin, or a mixture of two or more of the aforesaid resins.

8. A waterborne protective coating system according to claim 1 in which the at least one binder comprises an acrylic-alkyd hybrid resin.

9. A waterborne protective coating system according to claim 1 in which the at least one binder comprises an epoxy resin.

10. A waterborne protective coating system according to claim 1 in which the at least one grinding media comprises an aqueous solution of a modified aldehyde resin having at least one amine group.

11. A waterborne protective coating system according to claim 1 in which the at least one grinding media is a styrene/maleic anhydride copolymer.

12. A method of formulation of a waterborne protective coating system according to claim 1 comprising the steps of
   (a) obtaining a liquid dispersion of 2D material/graphitic nanoplatelets, water, at least one wetting agent, and at least one grinding media in an aqueous solution, wherein the at least one grinding media is water soluble or functionalised to be water soluble, and wherein the liquid dispersion comprises between 50 wt % and 90 wt % of the at least one grinding media, and
   (b) mixing the liquid dispersion of 2D material/graphitic nanoplatelets with at least one binder and water;
   wherein the 2D material/graphitic nanoplatelets are comprised of one or more of graphene nanoplatelets, graphitic nanoplatelets, and 2D material nanoplatelets and in which the graphene nanoplatelets are comprised of one or more of graphene nanoplates, reduced graphene oxide nanoplates, bilayer graphene nanoplates, bilayer reduced graphene oxide nanoplates, trilayer graphene nanoplates, trilayer reduced graphene oxide nanoplates, few-layer graphene nanoplates, few-layer graphene oxide nanoplates, few-layer reduced graphene oxide nanoplates, and graphene nanoplates of 6 to 10 layers of carbon atoms, and the graphitic nanoplatelets are comprised of one or more of graphite flakes with at least 10 layers of carbon atoms, graphite nanoplates with 10 to 20 layers of carbon atoms, graphite nanoplates with 10 to 14 layers of carbon atoms, graphite nanoplates with 10 to 35 layers of carbon atoms, graphite nanoplates with 10 to 40 layers of carbon atoms, graphite nanoplates with 25 to 30 layers of carbon atoms, graphite nanoplates with 25 to 35 layers of carbon atoms, graphite nanoplates with 20 to 35 layers of carbon atoms, or graphite nanoplates with 20 to 40 layers of carbon atoms, and the 2D material platelets are comprised of one or more of hexagonal boron nitride (hBN), molybdenum disulphide ($MoS_2$), tungsten diselenide ($WSe_2$), silicene (Si), germanene (Ge), graphyne (C), borophene (B), phosphorene (P), or a 2D in-plane or vertical heterostructure of two or more of the aforesaid materials.

13. A method according to claim 12 in which the liquid dispersion of 2D material/graphitic nanoplatelets is obtained by the steps of (i) creating a dispersing medium;
   (ii) mixing 2D material/graphitic nanoplatelets into the dispersing medium; and (iii) subjecting the 2D material/graphitic nanoplatelets to sufficient shear forces and or crushing forces to reduce the particle size of the 2D material/graphitic nanoplatelets, wherein the mixed dispersing medium mixture comprises the 2D material/graphitic nanoplatelets, the at least one grinding media, water, and the at least one wetting agent.

14. A method according to claim 13 in which the step of subjecting the 2D material/graphitic nanoplatelets to sufficient shear forces and or crushing forces to reduce the particle size of the 2D material/graphitic nanoplatelets is performed using a grinding mill, a dissolver, a bead mill, or a three-roll mill.

15. A method according to claim 13 in which the at least one wetting agent comprises one of a polymeric wetting agent, an ionic wetting agent, a polymeric non-ionic dispersing and wetting agent, a cationic wetting agent, an amphoteric wetting agent, a Gemini wetting agent, a highly molecular wetting and dispersing agent or a mixture of two or more of these wetting agents.

16. A method according to claim 13 in which the step of creating the dispersing medium comprises mixing the at least one grinding media with the water until it is homogeneous.

17. A method according to claim 13 in which the step of creating the dispersing medium comprises mixing the at least one grinding media, water and wetting agent until the at least one grinding media, water and wetting agent mixture is homogeneous.

18. A method according to claim 17 in which the wetting agent is added to the dispersing medium at the same time as the 2D material/graphitic nanoplatelets.

19. A method according to claim 12 in which the 2D material/graphitic nanoplatelets further comprises at least one 1D material.

20. A waterborne protective coating system that comprises at least one binder, water, and a dispersion of 2D material/graphitic nanoplatelets, wherein the 2D material/graphitic nanoplatelets are comprised of one or more of graphene nanoplatelets, graphitic nanoplatelets, and 2D material nanoplatelets and in which the graphene nanoplatelets are comprised of graphene nanoplates, the graphitic nanoplatelets are comprised of graphite nanoplates with 25 to 35 layers of carbon atoms, and the 2D material nanoplatelets are comprised of one or more of hexagonal boron nitride (hBN), molybdenum disulphide ($MoS_2$), tungsten diselenide ($WSe_2$), silicene (Si), germanene (Ge), graphyne (C), borophene (B), phosphorene (P), or a 2D in-plane or vertical heterostructure of two or more of the aforesaid materials, wherein the dispersion of 2D material/graphitic nanoplatelets comprises the 2D material/graphitic nanoplatelets, water, at least one wetting agent, and at least one grinding media, wherein the at least one grinding media is water soluble or functionalised to be water soluble, and wherein the dispersion comprises between 50 wt % and 90 wt % of the at least one grinding media.

\* \* \* \* \*